United States Patent
Leutsch et al.

[11] Patent Number: 6,004,659
[45] Date of Patent: Dec. 21, 1999

[54] WIPER BLADE

[75] Inventors: Wolfgang Leutsch, Buehlertal, Germany; Steven Desmet, Grimberger, Belgium; Hubert Verelst, Tienen, Belgium; Dirk De Coninck, Londerzeel, Belgium; Paul Wynen, Lamont, Belgium

[73] Assignee: Robert Bosch GmbH, Stuttgart, Germany

[21] Appl. No.: 08/945,782

[22] PCT Filed: Jan. 28, 1997

[86] PCT No.: PCT/DE97/00141

§ 371 Date: Oct. 22, 1997

§ 102(e) Date: Oct. 22, 1997

[87] PCT Pub. No.: WO97/35749

PCT Pub. Date: Oct. 2, 1997

[30] Foreign Application Priority Data

Mar. 27, 1996 [DE] Germany ............... 196 12 081

[51] Int. Cl.⁶ ..................................... B32B 7/02
[52] U.S. Cl. ................ 428/212; 428/217; 428/223; 428/492; 296/70; 296/78.1; 15/250.361; 15/250.37; 15/250.38
[58] Field of Search ................... 428/212, 217, 428/223, 492; 15/250.36, 250.42, 250.37, 250.38, 250.39, 250.19, 250.16; 296/78.1, 70; 264/340

[56] References Cited

U.S. PATENT DOCUMENTS 4,716,618  1/1988  Yasukawa et al. ............... 15/250.36

FOREIGN PATENT DOCUMENTS

3527093C2  12/1989  Germany .
920323  3/1963  United Kingdom .

Primary Examiner—Deborah Jones
Assistant Examiner—Abraham Bahta
Attorney, Agent, or Firm—Michael J. Striker

[57] ABSTRACT

The invention relates to a wiper blade having a head (1) for fastening in the wiper holder bracket, a tilting rib (2), and a lip (3). It is characterized in that the head (1) comprises a stiff polymer, hardened by halogenation, with a Shore A hardness of 60 to 85; the tilting rib (2) comprises a comparatively soft, elastic polymer that is not hardenable or not substantially hardenable by halogenation, with a Shore A hardness of 50 to 75; and the lip (3) comprises a polymer hardenable by halogenation having a Shore A hardness of 60 to 85. The Shore A hardness of the polymer comprising the tilting rib (2) is less expediently by at least two units than the Shore A hardness of the polymer or polymers that form the head (1) and the lip (3).

11 Claims, 1 Drawing Sheet

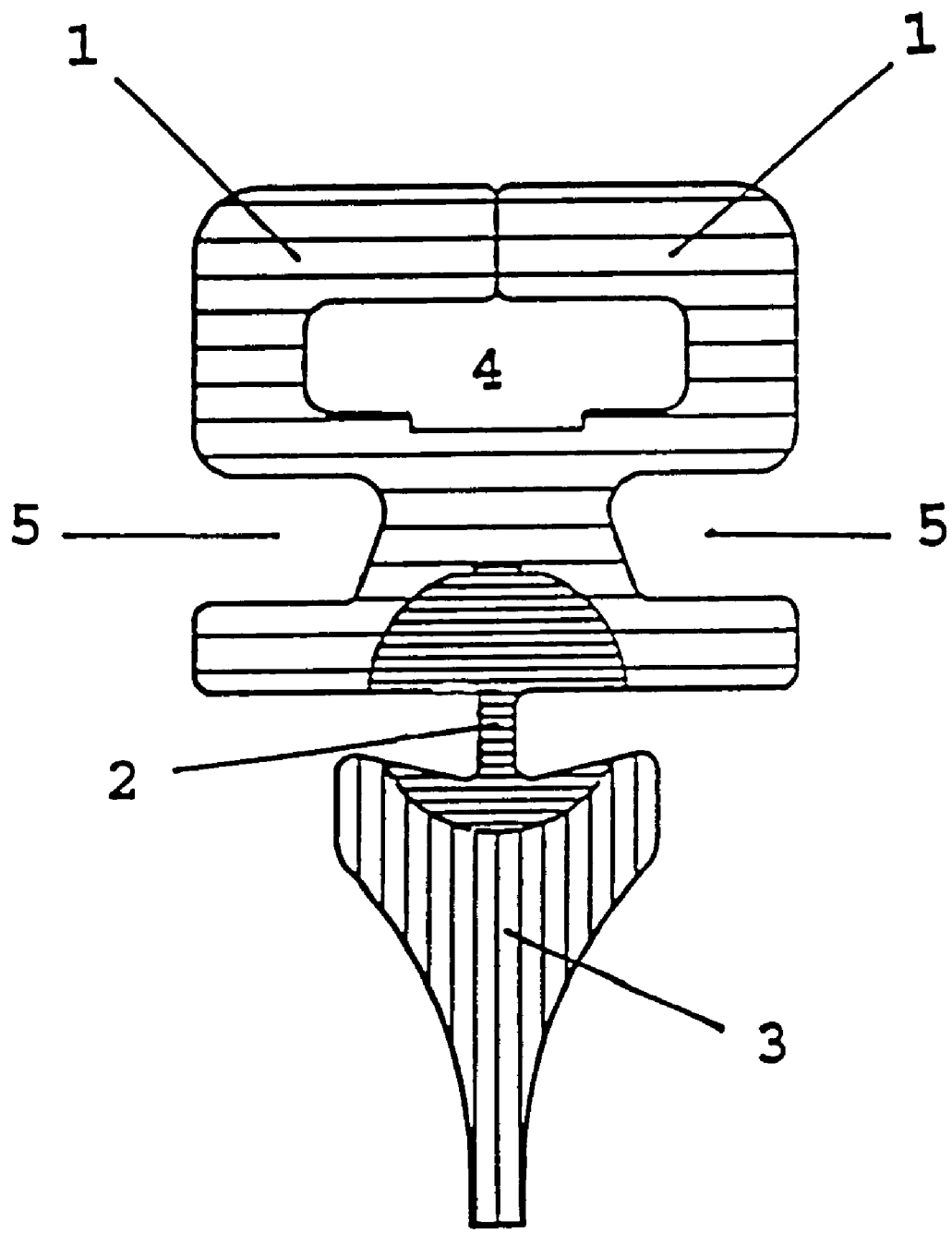

WIPER BLADE

BACKGROUND OF THE INVENTION

Field of the Invention

The present invention relates to a wiper blade for a motor vehicle or aircraft.

Wiper blades for motor vehicles or aircraft are exposed to severe mechanical stresses, on the one hand from dust, insect residues or other hard dirt ingredients that make the glass surface to be cleaned rough, and on the other by the tilting stress, which changes continually during the wiping operation and is permanent in the position of repose as a consequence of the persistent contact pressure against the glass. Besides the mechanical stresses there are also chemical or environmental factors, for instance from ozone, oil, and alcohol and/or detergents in the windshield washing fluid. Wiper blades with suitably adapted profiles (or cross-sections) are extruded, as a rule continuously, from cross-linkable (or vulcanizable) polymer mixtures, which are cross-linked after extrusion and are cut to the requisite length. The profiles have a head (also called a base part or spine), with which the wiper blade is secured by the claws in the windshield wiper blade holder bracket system. Recesses for one or more spring rails of elastic metal or plastic located in the head are intended to stabilize the wiper blade and bring about the most uniform possible contact pressure over the entire length of the wiper blade.

On its side toward the glass, the head changes into a tilting rib, also known for short as a rib, neck, hinge, or changeover rib, and connects the head to the lip, which as the actual functional part of the wiper blade keeps the glass free of water when the windshield wiper is in operation. The tilting rib is the mechanically most severely stressed part of the wiper blade. Depending on its height and on the design of the opposed faces of the head and lip, the lip with its main cross-sectional axis can deviate in the position of repose by up to about 45° from the vertical on the glass. In the operating state the lip trails behind the head, thus forcing a tilting motion each time there is a change of direction. The main cross-sectional axis accordingly changes its position in operation constantly by up to approximately ±45°.

The materials of which wiper rubber is made are natural or synthetic polymers or copolymers with double bonds, which are cross-linked for instance with organic peroxides and/or sulfur and/or certain metal oxides. Wiper blades of the prior art, with all the parts mentioned, may all be made of a single material. While this is favorable for production purposes, it does not suitably meet the various demands made of the different parts of the wiper blade. For instance, if the material is relatively soft and elastic, it meets important demands made of the tilting rib but is less suitable for the head, because the head during operation is not infrequently twisted out of the claws that hold the wiper blade in the metal holder bracket. Conversely, if the material is stiffer and less elastic, then while it is well-suited for the head it i not so appropriate in view of the tilting stress to which the tilting rib is constantly exposed.

Wiper blades of only a single material, namely natural rubber or a mixture of natural rubber and chloroprene rubber, or a rubber of the diene type, such as butadiene rubber and styrene-butadiene rubber, are mentioned in German Patent DE-C2 35 27 093 as being part of the prior art. Natural rubber and other kinds of rubber of the diene type also include olefin double bonds and are therefore vulnerable to ozone. The tendency to ozonolysis can be repressed by means of certain additives. By "halogenation", for instance treatment with a hypochlorite solution, the surface of the wiper blade can be surface-hardened. This is advantageous for the lip, because it increases the abrasion resistance of the lip. However, compromises must be made, because overly extensive halogenation of the surface, which is desirable for the sake of abrasion resistance, can make the lip overly nonconforming, so that it no longer adapts well enough to the glass, which is usually curved. For a tilting rib of natural rubber, or natural rubber and other kinds of rubber of the diene type, however, halogenation is harmful because it promotes a persistent deformation under compressive stress. The wiper blade is exposed to such a stress both in the position of repose and in operation, because it is pressed constantly against the glass. In addition, the halogenation favors the formation of cracks under the influence of sunlight, which for the mechanically highly stressed tilting rib during wiping, as a result of the continual tilting motions, is especially undesirable.

The wiper blade according to the invention defined by DE-C2 5 27 093 substantially comprises only a single material, namely EPDM rubber, which is a copolymer of ethylene, propylene and a diene, that is cross-linked with peroxides and is largely resistant to ozone. Only on the lower end of the lip, toward the glass, and in the upper peripheral zones of the head does the wiper blade have small segments of smaller amounts of diene rubber. EPDM rubber often also includes an oil, which improves flexibility at low temperatures. This oil tends to migrate to the periphery (or sweat out) and particularly in relatively long phases of repose, the head and lip, which touch one another in the state of repose, tend to stick together as a result. Moreover, over the short or long term, the oil also migrates into the diene rubber and to the surface thereof that touches the glass. Dust and dirt that stick to the oil then cause smears and streaks during wiping. In addition, EPDM rubber is not resistant to chemicals. Windshield wiper cleaning fluids that contain alcohol thus gradually impair the physical properties of the rubber. Finally, EPDM has a high coefficient of friction, which makes it difficult to insert especially internal spring strips, and makes it necessary to coat the surface of the spring strips or to use lubricant aids, such as molybdenum sulfide.

Wiper blades of different, coextruded materials have also been disclosed in which, unlike those in DE-C2 35 27 093, the various materials are used in comparable amounts. In European Patent Disclosure EP-A1 0 625 452, a wiper blade is disclosed that comprises at least two different materials. In one of the embodiments described (FIG. 1), the head and the tilting rib comprise the same material, while the lip of a different material includes a reinforcement into which the narrow tilting rib runs out. This embodiment has the disadvantage described above, which is that the material does not fully meet the various demands made of the head and the rib.

SUMMARY OF THE INVENTION

According to the invention the wiper blade has a head for fastening in the wiper holder bracket, a tilting rib and a lip. The head comprises a stiff polymer, hardened by halogenation, with a Shore A hardness of 60 to 85, the tilting rib comprises a comparatively soft, elastic polymer that is not hardenable or not substantially hardenable by halogenation, with a Shore A hardness of 50 to 75; and the lip comprises a polymer hardenable by halogenation having a Shore A hardness of 60 to 85.

The wiper blades according to the invention have a head of a stiff, smooth material, which allows it to sit firmly in the jaws of the metal holder bracket, so that, when the wiper is operated the wiper blades do not tend to twist out of the mount. The material comprising the tilting rib does not vary, or varies hardly at all and therefore does not have a tendency to persistent deformation under compressive strain or to crack formation from the effect of sunlight. Even during long phases of repose, the head and the lip do not stick together, because they do not comprise oil-containing EPDM rubber. Since the tilting rib has a comparatively low mass, oil does not migrate to a significant extent into the lip, causing the lip to make smears and streaks to a significant extent, even if the tilting rib is of EPDM rubber. Spring strips can be slipped into the head of stiff, smooth material, either during manufacture or by the final consumer purchasing a new wiper blade, without having to use lubricants. The wiper blades are tough and abrasion-resistant even over long periods of time, are resistant to water, oil, detergents and many other chemicals, and resist degradation under the influence of ozone and visible and ultraviolet light. These exhibit these properties over a wide temperature range, including the temperatures that can prevail during use as intended.

BRIEF DESCRIPTION OF THE DRAWING

The objects, features and advantages of the invention will now be illustrated in more detail with the aid of the following description of the preferred embodiments, with reference to the sole figure which is a cross-sectional view through a wiper blade according to the invention.

DETAILED DESCRIPTION OF THE PREFERRED EMBODIMENT

The wiper blade shown in the figure has a head 1, a tilting rib 2 and a lip 3. A recess 4 is provided in the head 1 into which an internal spring strip (not shown) has been introduced. The metal claws (also not shown), which firmly hold the wiper blade in the wiper holder bracket, engage the recesses 5.

The head 1 of the wiper blade comprises a stiff polymer, hardened by halogenation, with a Shore A hardness of 60 to 85. The wiper head should be stiff, so that it will sit firmly enough in the claws of the holder bracket that it will not twist out of the claws during wiper operation. On the other hand, it should not be rigid but rather should be elastic to a certain extent. Otherwise, the wiper blade, whose properties in the respect are definitively determined by the properties of the head, would no longer adapt well enough to the curvature of what is usually a curved pane. A suitable parameter for the characterization of polymers having the desired properties is the Shore A hardness, which is determined by the test specification DIN 2240 or DIN 53505. The Shore A hardness of the head material is expediently 60 to 70. Polymers with these Shore A values have the desired stiffness and are elastic to the desired extent.

The polymers of the head 1 are also hardened by halogenation. This reduces the frictional resistance and abrasion. The reduced frictional resistance makes the surface smooth. This is expedient, because the spring strips can then be drawn easily into the wiper blade. This is naturally especially true for wiper blades with an internal spring strip, of the kind shown in the drawing. Furthermore, a smooth wiper head makes it easier to install the wiper blade in the claws of the holder bracket system. The reduced abrasion is desired at those points where the claws firmly hold the head, because these points are abrasively stressed in the back-and-forth motion of the wiper.

Polymers suitable for the head 1 include for instance vulcanized natural caoutchouc (natural rubber) and other kinds of the rubber of the butadiene type, such as butadiene rubber and butadiene-styrene rubber. The polymers for the caoutchouc mixture, the hardening agents in terms of type and amount, the extrusion parameters, and the conditions of vulcanization are all selected such that a rubber is produced that meets the desired Shore A hardness. The relationship between the Shone A hardness and the aforementioned parameters is well known to one skilled in the art. The methods for halogenation are also prior art. Typically, they are performed such that the wiper blade 1 is dipped for up to 10 minutes in a sodium hypochlorite solution having a temperature of 20 to 30° C. and containing from 5 to 10% available chlorine.

One essential characteristic of the wiper blade according to the invention is a tilting rib 2 of a comparatively soft, elastic polymer having a Shore A hardness of 50 to 75, and in particular 55 to 65. Here, "comparatively" means "in comparison with the polymers of the head 1 and the lip 3". The Shore A hardness is expediently less by at least two units than the Shore A hardness of the polymer or polymers that form the head 1 and lip 3. Preferably, the Shore A hardness of the tilting rib is less by at least five and in particular at least ten units than the Shore A hardness of the polymer or polymers that form the head 1 and the lip 3.

Expediently, a polymer that is resistant to ozone is selected. The polymer must not be hardened, or must be hardened only insignificantly, in the halogenation of the wiper blade. Polymers hardened by halogenation exhibit microscopically small clods on the surface. Such clods should not be present, or hardly present, after the halogenation of the wiper blade. At least, there should be no cohesive layer of clods. Although the halogenation improves the frictional resistance and the abrasion resistance, it also promotes the formation of cracks under the influence of light and ozone, which can lead to the mechanical disintegration of the wiper blade. The tendency to crack formation is tolerable for the head 1, because at least at the stressed points the head is largely protected against direct sunlight by the metal holder bracket. Hence there, the advantages of the halogenation predominate over its disadvantages. For the comparatively narrow tilting rib 2, however, which is especially stressed by the back-and-forth motion during wiping and moreover is more severely exposed to direct sunlight, conversely, the selected polymers should be not halogenatable, or not substantially so. The hardenability of polymers by halogenation is a property that is defined by the structure of the polymers. These relationships are familiar to one skilled in the art.

For the rib 2, suitable, comparatively soft and elastic polymers may be selected for instance from the following suitably adjusted types of rubber: EPDM (terpolymers of ethylene, propylene and a diene with the remainder being olefin double bonds), ACM (copolymers of ethacrylate or other acrylates with small amounts of vulcanization-promoting monomers), CFM (polytrichlorofluoroethylene), CSM (chlorosulfonated polyethylene), IM (polyisobutene), ECO (copolymers of ethylene oxide with epichlorhydrine), and FVMQ (silicone rubber with methyl and vinyl groups and fluorine atoms in the polymer chain).

The lip 3 comprises a polymer, hardened by halogenation, with a Shore A hardness of 60 to 85. Advantageously, the Shore A hardness is 60 to 70. Usable polymers are those described above, for instance, that are suitable for the head 1, but the stiffness here is less important than the certain amount of elasticity, which makes it easier for the lip to conform to the usually curved pane of glass. The head and the lip 3 may comprise the same polymer, or different polymers for these two parts may also be used. The lip 3 is hardened by halogenation. A low frictional resistance of the lip is important, because otherwise, especially at high speed, chattering becomes audible, and in an extreme case the wiper motor will even burn out. The fact that frictional resistance is a desirable property precisely at those points where the lip 3 touches the dirty glass needs no further explanation.

The wiper blades can be produced in the usual way by coextrusion of the various cross-linkable polymer mixtures, cross-linking of the coextrudate under heat, and cutting apart the extruded strand to the desired blade lengths. These techniques are well known to one skilled in the art. The cross-linkable polymer mixtures may contain the usual cross-linking agents and additives, such as sulfur, sulphenamides, peroxides (such as dicumyl peroxide), and soot, zinc oxide and other fillers, and heat, oxidation and ozonolysis stabilizers.

We claim:

1. A wiper blade having a head (1) for fastening in a wiper holder bracket, a tilting rib (2) and a lip (3), wherein the head (1) comprises a comparatively stiff polymer, hardened by halogenation, with a Shore A hardness of 60 to 85; the tilting rib (2) comprises a comparatively soft, elastic polymer not hardenable or not substantially hardenable by halogenation, with a Shore A hardness of 50 to 75; and the lip (3) comprises a polymer hardenable by halogenation having a Shore A hardness of 60 to 85;

wherein the Shore A hardness of the polymer comprising the tilting rib (2) is less by at least two units than the Shore A hardness of the polymer or polymers that form the head (1) and the lip (3).

2. The wiper blade of claim 1, wherein the Shore A hardness of the polymer comprising the tilting rib (2) is less by at least five units than the Shore A hardness of the polymer or polymers that form the head (1) and the lip (3).

3. The wiper blade of claim 1, wherein the Shore A hardness of the polymer comprising the tilting rib (2) is less by at least ten units than the Shore A hardness of the polymer or polymers that form the head (1) and the lip (3).

4. The wiper blade of claim 1, wherein the Shore A hardness of the head (1) and/or the lip (3) is between 60 and 70.

5. The wiper blade of claim 1, the Shore A hardness of the tilting rib is between 55 and 65.

6. The wiper blade of claim 1, the tilting rib (2) comprises EPDM rubber.

7. The wiper blade of claim 1, wherein the head (1) and the lip (3) comprise different polymers.

8. The wiper blade of claim 1, wherein the head (1) and the lip (3) comprise the same polymer.

9. The wiper blade of claim 1, it is produced by coextrusion, cross-linking of the coextrudate, and cutting of the extruded strand to the desired length of blade.

10. A wiper blade having a head (1) for fastening in a wiper holder bracket, a tilting rib (2) and a lip (3), wherein the head (1) comprises a comparatively stiff polymer, hardened by halogenation, with a Shore A hardness of 60 to 85; the tilting rib (2) comprises a comparatively soft, elastic polymer not hardenable or not substantially hardenable by halogenation, with a Shore A hardness of 50 to 75; and the lip (3) comprises a polymer hardenable by halogenation having a Shore A hardness of 60 to 85;

wherein the Shore A hardness of the polymer comprising the tilting rib (2) is less by at least five units than the Shore A hardness of the polymer or polymers that form the head (1) and the lip (3), and wherein said head (1) and said lip (3) do not contain EDPM rubber and said tilting rib comprises EDPM rubber, ACM rubber, CFM rubber, CSM rubber, IM rubber, ECO rubber or FVMQ rubber.

11. The wiper blade of claim 10, wherein said head and said lip comprises butadiene rubber.

* * * * *